US005664100A

United States Patent [19]
Miura

[11] Patent Number: 5,664,100
[45] Date of Patent: Sep. 2, 1997

[54] DATA TRANSMISSION PROCESSING METHOD AND APPARATUS

[75] Inventor: Iwao Miura, Kawasaki, Japan

[73] Assignee: Fujitsu Limited, Kawasaki, Japan

[21] Appl. No.: 320,250

[22] Filed: Oct. 11, 1994

[30] Foreign Application Priority Data

Jan. 14, 1994 [JP] Japan ................... 6-002291

[51] Int. Cl.$^6$ ................................ G06F 15/163
[52] U.S. Cl. .............. 395/200.62; 395/621; 370/230
[58] Field of Search ................... 395/800, 600, 395/200.01

[56] References Cited

U.S. PATENT DOCUMENTS

| | | | |
|---|---|---|---|
| 4,891,785 | 1/1990 | Donohoo | 395/200.01 |
| 5,021,949 | 6/1991 | Morten et al. | 370/94.1 |
| 5,058,000 | 10/1991 | Cox et al. | 395/600 |
| 5,086,497 | 2/1992 | Horikawa et al. | 395/147 |
| 5,153,744 | 10/1992 | Nobuta | 358/400 |
| 5,278,978 | 1/1994 | Demers et al. | 395/600 |
| 5,323,450 | 6/1994 | Goldhagen et al. | 379/100 |
| 5,388,257 | 2/1995 | Bauer | 395/600 |
| 5,483,653 | 1/1996 | Furman | 395/650 |
| 5,522,041 | 5/1996 | Murakami et al. | 395/200.01 |
| 5,522,066 | 5/1996 | Lu | 395/200.07 |
| 5,572,724 | 11/1996 | Watanabe et al. | 395/616 |

OTHER PUBLICATIONS

Robert Bressler et al, "Remote Job Entry Protocol", RFC 407, 1972, pp. 1–20.
J. Pastel et al, "File Transfer Protocol", RFC 959, 1985, pp. 1–69.

Primary Examiner—Mehmet B. Geckil
Attorney, Agent, or Firm—Staas & Halsey

[57] ABSTRACT

When file data is transmitted from a host computer to a workstation, in the case where a self transmission file name, a transmission partner name, and a reception file name of the transmission partner side are designated, check information of the transmission file is transmitted from a file matching check section provided in a client check section prior to the data transmission. A file matching check section provided for a server check section of a computer on the transmission destination side executes a previous check to judge whether the reception can be performed or not from the reception check information and returns the result of the judgment. When the data can be received by the previous check, the file data is transmitted from a data transmitting section provided for a client section of a computer on the transmission side to a data receiving section provided for the server section of the computer on the transmission destination side. Further, there are executed an optimum file automatic allocation on the server side, an acquisition of an access right by an access right check using a user ID and a password, instructions to activate a job and to return the result, a code automatic conversion, and the like.

31 Claims, 17 Drawing Sheets

| ITEM | CODE |
|---|---|
| MAIL BOX | VOL1: DISK1 VOL2: DISK2 |
| SELF HOST ST NAME | H1 |
| SELF HOST FACTORY NAME | HOST1 |
| SELF HOST CODE SYSTEM | EBCDIC |
| INFORMATION KIND NAME 1 | DATA1 |
| INFORMATION KIND NAME 2 | DATA2 |
| ⋮ | ⋮ |
| OTHER WS ST NAME | W1 |
| OTHER WS FACTORY NAME | WORKST1 |
| OTHER WS CODE SYSTEM | EUC |

FIG. 3

| ITEM | CODE |
|---|---|
| MAIL BOX | VOL1: root/SOLT |
| SELF WS ST NAME | W1 |
| SELF WS FACTORY NAME | WORKST1 |
| SELF WS CODE SYSTEM | EUC |
| INFORMATION KIND NAME 1 | DATA1 |
| INFORMATION KIND NAME 2 | DATA2 |
| ⋮ | ⋮ |
| OTHER HOST ST NAME | W1 |
| OTHER HOST FACTORY NAME | HOST1 |
| OTHER HOST CODE SYSTEM | EBCDIC |

FIG. 4

| ITEM | CODE |
|---|---|
| INFORMATION KIND NAME 1 | JOB1 |
| INFORMATION KIND NAME 2 | JOB2 |

FIG. 5

| ID FLAG 100 | |
|---|---|
| TRANSMISSION | R |
| RECEPTION | S |

FIG. 7

| SENDING SIDE INFORMATION 102 | |
|---|---|
| SELF COMPUTER NAME (HOST1, WORKST1) | REQUESTER INFORMATION |

FIG. 8

| SENDING SIDE INFORMATION 104 | |
|---|---|
| OTHER COMPUTER NAME (WORKST1, HOST1) | REQUESTER INFORMATION |

FIG. 9

| INFORMATION KIND 106 |
|---|
| INFORMATION KIND NAME X |

FIG. 10

| SIGNAL DISTRIBUTION INFORMATION 108 ||| 
|---|---|---|
| ITEM | HOST | WORK STATION |
| TRANSMISSION FILE NAME | XXXX, YYYY, ZZZZ | /XXX/YYY/ZZZ |
| EDITION | PS, PO | dir, file |
| ALLOCATION UNIT | BLK, TRK, CYL | byte |
| APPARATUS TYPE | F6425, F6421 | |
| NUMBER OF RECORDS | | |
| RECORD LENGTH | | NONE |
| BLOCK LENGTH | | NONE |
| FILE FORMAT | | NONE |

FIG. 11

| RECEPTION INFORMATION 110 | | |
|---|---|---|
| ITEM | WORK STATION | HOST |
| TRANSMISSION FILE NAME | /XXX/YYY/ZZZ | XXXX, YYYY, ZZZZ |
| EDITION | dir, file | PS, PO |
| ALLOCATION UNIT | byte | BLK, TRK, CYL |
| APPARATUS TYPE | | F6425, F6421 |
| NUMBER OF RECORDS | | |
| RECORD LENGTH | NONE | |
| BLOCK LENGTH | NONE | |
| FILE FORMAT | NONE | |

FIG. 12

| LINK JOB INFORMATION 112 | | | | |
|---|---|---|---|---|
| UNACTIVATION | ACTIVATION 1 | ACTIVATION 2 | COMPLETION OK | COMPLETION NG |

— RETURN JOB RESULT

— ONLY EXECUTION OF JOB

FIG. 13

DATA TRANSMISSION PROCESSING METHOD AND APPARATUS

BACKGROUND OF THE INVENTION

The present invention relates to data transmission processing method and apparatus for transmitting data between computers each having a different operating system (hereinafter, referred to as an OS) and, more particularly, to data transmission processing method and apparatus for transmitting file data by using a server/client function between a host computer and a workstation.

In recent years, a server/client system in which a plurality of workstations are connected by a network has been being spread. On the other hand, hitherto, a computer system in which a number of exclusive-use data terminal equipment are connected to a host computer by a network has been being spread.

In such a conventional computer system, in order to reduce a burden of a host computer and to improve a processing performance, it is necessary to build a system in which a plurality of workstations are connected to the host computer by a network and a server/client function is provided for all of the host computer and workstations.

In such a system in which the host computer and the workstations are coupled, the host computer and the workstations function each other as a server and a client, necessary file data is sent to a partner, a transfer of necessary file data is requested to the partner, and a process which makes the most of peculiar functions of the respective computers can be realized.

For example, the host computer can have an efficient operating form such that a process is executed with respect to a library function to store a great amount of information as a center and a daily work is executed by each workstation and only the results are transmitted to the host computer.

As for a procedure of the data transmission between the host computer and the workstations, for example, in case of transferring file data from the workstation to the host computer, a log-in is performed by instructions of a partner host name, user ID, and password by using a connection command to the partner computer, thereby connecting to the partner computer.

When the connection is completed, a transmission file name is instructed by a transmitting command, a reception file name is also instructed by a receiving command, and a transmitting process of file data from the workstation to the host computer is executed.

In the case where a plurality of workstations are connected to the conventional host computer through a network and data is transmitted by the server/client function, however, since the OS of the host computer differs from the OS of the workstations, the concepts when dealing with the file are different. Therefore, when the data is transferred between the host computer and each workstation, a skill of the operator and various attentions are needed.

Although the operators of the host computer and the workstation know the self file environment very well, however, they often don't have enough knowledge with respect to the file environment of the partner computer. As a result, there is a fear such that the following problems frequently occur.

I. Since the operator must previously discriminate the presence or absence, attribute, or the like of the file, there are many cases where an error occurs.

II. Although there is an allocating function of the files at the time of transfer of the data, in the case where an allocation such as capacity, format, or the like is erroneously instructed upon transferring data, there are many cases where an error occurs.

III. At the time of transfer of the data, the data cannot be transmitted unless the reception file name on the partner computer side is instructed, so that the reception file name on the partner computer side has to be always managed.

IV. Although the job can be activated on the partner computer after the file was transferred, the transfer of the job completion information and the job result data cannot be handled unless the log-in is newly executed to the partner computer, so that a troublesomeness and a time are required to obtain the result.

V. Even if the data transfer ends normally, due to a difference of code systems, the data cannot be actually handled and a code conversion has to be performed by the computer on the reception side.

SUMMARY OF THE INVENTION

According to the invention, there are provided data transmission processing method and apparatus in which with respect to the transfer of file data between computers of different operating systems, a user burden and transfer obstacles can be reduced and a transferring process can be safely and certainly executed.

First, according to the present invention, there is provided a data transmission processing system to transmit and receive data between at least two computers of different operating systems, for example, between a host computer and a workstation by using a transmission path.

There are the following two modes of the data transmission of the invention.

Mode 1: mode to transfer the file data from a specific computer to another computer Mode 2: mode to request another computer to transfer the file data First in Mode 1, for example, it is now assumed that the host computer is set to a computer on the transmission original side and the file data of the host computer is transmitted to the workstation as a computer on the transmission destination side. In this instance, when the computer on the transmission original side designates a self transmission file name, a transmission partner name, and a reception file name of the transmission partner side, check information regarding the transmission file is transmitted together with the transmission designation information from the computer on the data transmission original side to the computer on the data transmission destination side by a file matching check section provided in a client check section.

In a server check section provided for the computer on the transmission destination side, the file matching check section executes a previous check to judge whether the reception can be performed or not on the basis of the received check information and returns the result of the judgment.

In the case where the judgment result indicating that the reception can be performed is obtained in the previous checking step, the data of a target file is transmitted from a data transmitting section provided in a client section of the transmission original side computer to a data receiving section provided in a server section of the transmission destination side computer.

The file matching check section provided in the client check section of the transmission original side computer forms check information indicative of a data attribute, a capacity, and a format of the designated self transmission file, transmits the check information to the computer on the transmission destination side, and allows the transmission destination side computer to judge whether the reception can be performed or not and to return the result of the judgement.

In this instance, when the designated reception file is not previously allocated to the computer on the data reception side, an automatic optimum file allocating section provided in the server check section executes an optimum file allocating process for newly assuring a reception file of the designated file name according to the data attribute, capacity, and format received at the time of the previous check.

In the case where the designated reception file is not previously allocated and the reception file name is also not designated in the transmission information designating step, a reception file according to the data attribute, capacity, and format received in the previous checking step is assured on a mail box by an arbitrary file name.

When it is judged by the previous check that the reception can be performed, the file matching check section of the server check section allows the reception side computer to execute an exclusive control to inhibit the access to the reception file. Simultaneously, the file matching check section of the client check section which received the return result indicating that the reception can be performed allows the transmission original side computer to execute an exclusive control to inhibit the access to the transmission file.

The data transmitting section provided in the client section of the transmission original side computer can add additional information to designate a job execution of the file transmitted to the transmission destination side computer to ordinary transmission control information and can transmit the resultant information. The transmission destination side computer activates the job on the basis of the additional information to designate the job execution after the file data was received.

Further, the data transmitting section of the client section can include job completion information and return control information of job result data into the additional information to designate the job execution and can transmit the resultant information. In this case, the data transmitting section provided in the client section of the transmission destination side computer automatically transmits the job completion information and the job result data upon completion of the job. Further, in the case where no return control information is included in the additional information to designate the job execution, only the job completion information can be also automatically transmitted.

The client section of the transmission original side computer further has a directory extracting section for extracting directory information regarding the transmission file and for transmitting the directory information by the transmission original side computer after completion of the data transmission. In correspondence to the directory extracting section, the server section of the destination side computer has a directory automatic reconstruction forming section for reconstructing a directory information management file of the file received from the transmission destination side computer on the basis of the received directory information.

Further, in the case where edition information to instruct a change, correction, or the like of the directory information which was executed prior to the transmission of the directory information is additionally transmitted by the directory extracting section on the transmission original side, the directory automatic reconstruction forming section on the transmission destination side forms a new directory information management file on the basis of the directory information and edition information received.

In Mode 2 for requesting the data transfer to another computer, for example, a transfer request is sent from the host computer (request original side computer) to the workstation (request destination side computer), thereby transmitting the file data. In this case, a user ID and a password are transmitted from an access right check section provided in the client check section of the transfer request original side computer. The access right check section is provided in the server check section of the computer on the transfer request destination side. The access right check section judges a validity of the received user ID and password and responds the presence or absence of the access right acquisition.

When the response of the access right acquisition is received, the access right check section on the transfer request original side hands over the process to the file matching check section. When a previous check is performed and it is judged that the transfer can be executed, the data is transferred from the request original side computer.

The client section of the computer on the transmission original side or the transfer request original side has an automatic code converting section for converting the transmitting file data to be transmitted into a code which is used in the partner side computer and for transmitting the code.

According to the data transmission processing method and apparatus of the present invention having the construction as mentioned above, the file matching check function is provided for both of the server and client provided in each computer, so that whether the data can be transferred or not can be judged as a previous check before the transferring process and a transfer error at the time of transfer data can be eliminated.

By providing the message communicating function for both of the server and client, a number of information communications other than the data transmitting process including the previous check can be realized.

Further, by providing the code automatic converting function for both of the server and client, a file can be transferred without becoming aware of the code systems due to the different OSs.

Further, a security of the transmission/reception file is established by adding the access right checking function to both of the server and client.

On the other hand, by adding the directory extracting function to the client, the directory information is extracted and is transferred together with the file data. Further, by adding the directory editing function, the edition information can be also transmitted.

Further, by providing the directory automatic reconstruction forming function for the server, in addition to the file, the file to which the directory information was added is reconstructed. In this case, when the edition information is further added, new file information according to the edition information can be formed.

By providing the automatic optimum file allocating function for the server, a troublesomeness to previously allocate a file by the user is eliminated and even if no file is previously allocated, data can be received by the mail box and the occurrence of an allocation error can be prevented.

The above and other objects, features, and advantages of the present invention will become more apparent from the following detailed description with reference to the drawings.

BRIEF DESCRIPTION OF THE DRAWINGS

FIG. 3 is an explanatory diagram of a system control management file on the host side in FIG. 2;

FIG. 4 is an explanatory diagram of a system control management file on the workstation side in FIG. 2;

FIG. 5 is an explanatory diagram of a link process job management file in FIG. 2;

FIG. 7 is an explanatory diagram of an ID flag in FIG. 6;

FIG. 8 is an explanatory diagram of sending side information in FIG. 6;

FIG. 9 is an explanatory diagram of sending destination side information in FIG. 6;

FIG. 10 is an explanatory diagram of an information kind in FIG. 6;

FIG. 11 is an explanatory diagram of signal distribution information in FIG. 6;

FIG. 12 is an explanatory diagram of reception information in FIG. 6;

FIG. 13 is an explanatory diagram of link job information in FIG. 6;

DETAILED DESCRIPTION OF THE PREFERRED EMBODIMENTS

[System construction and function]

Figure 1:
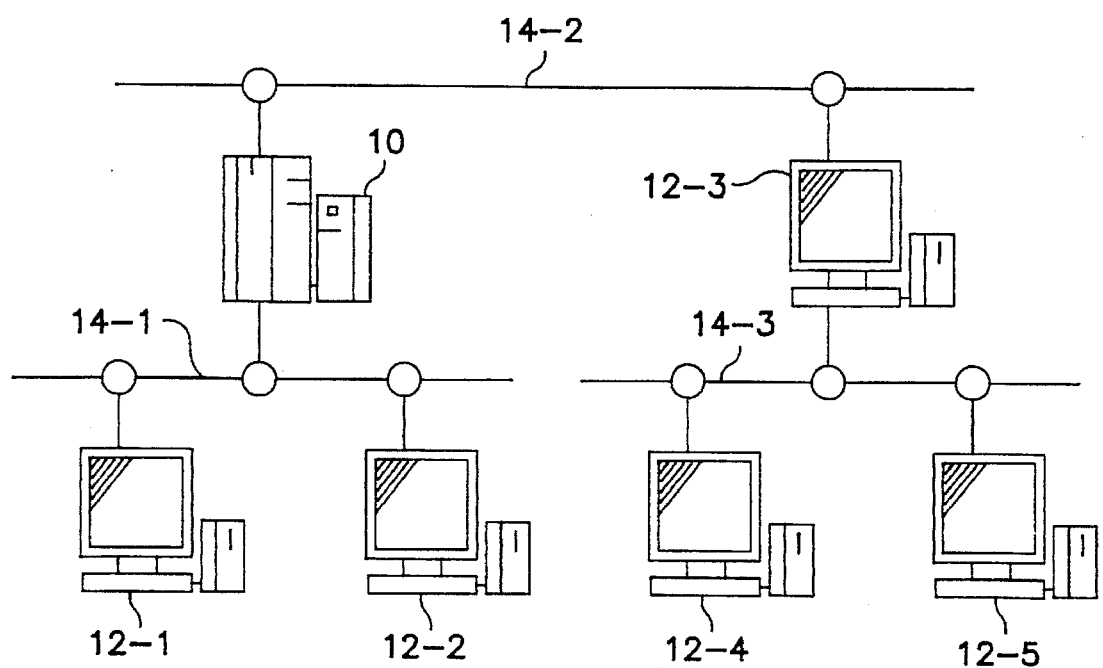
FIG. 1 is an explanatory diagram of a system construction of the invention.

FIG. 1 shows a system construction to which a data transmitting process of the invention is applied. Transmission paths 14-1 and 14-2 are led out from a host computer 10. Workstations 12-1 and 12-2 are connected to the transmission path 14-1. A workstation 12-3 is connected to the transmission path 14-2. Further, the workstation 12-3 is connected to other workstations 12-4 and 12-5 by a transmission path 14-3. The host computer 10 and the workstations 12-1 to 12-5 have different OSs, respectively. The concepts of the OSs to deal with a file which has been predetermined as a processing unit of data are different. The host computer 10 can transfer data to the workstations 12-1, 12-2, and 12-3.

Figure 2A:
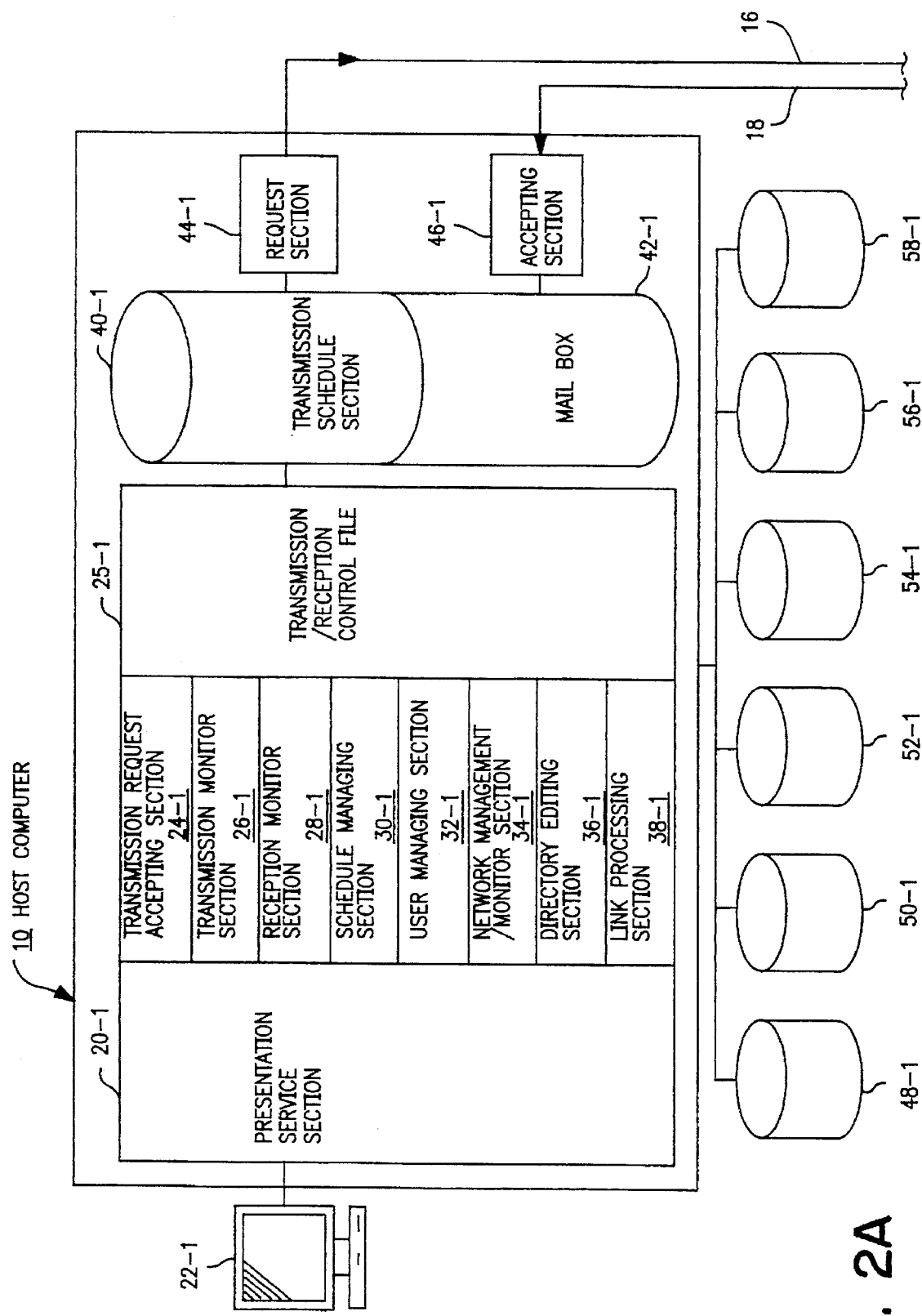
FIGS. 2A and 2B are functional block diagrams of host computers and workstations to which the invention is applied.
Figure 2B:
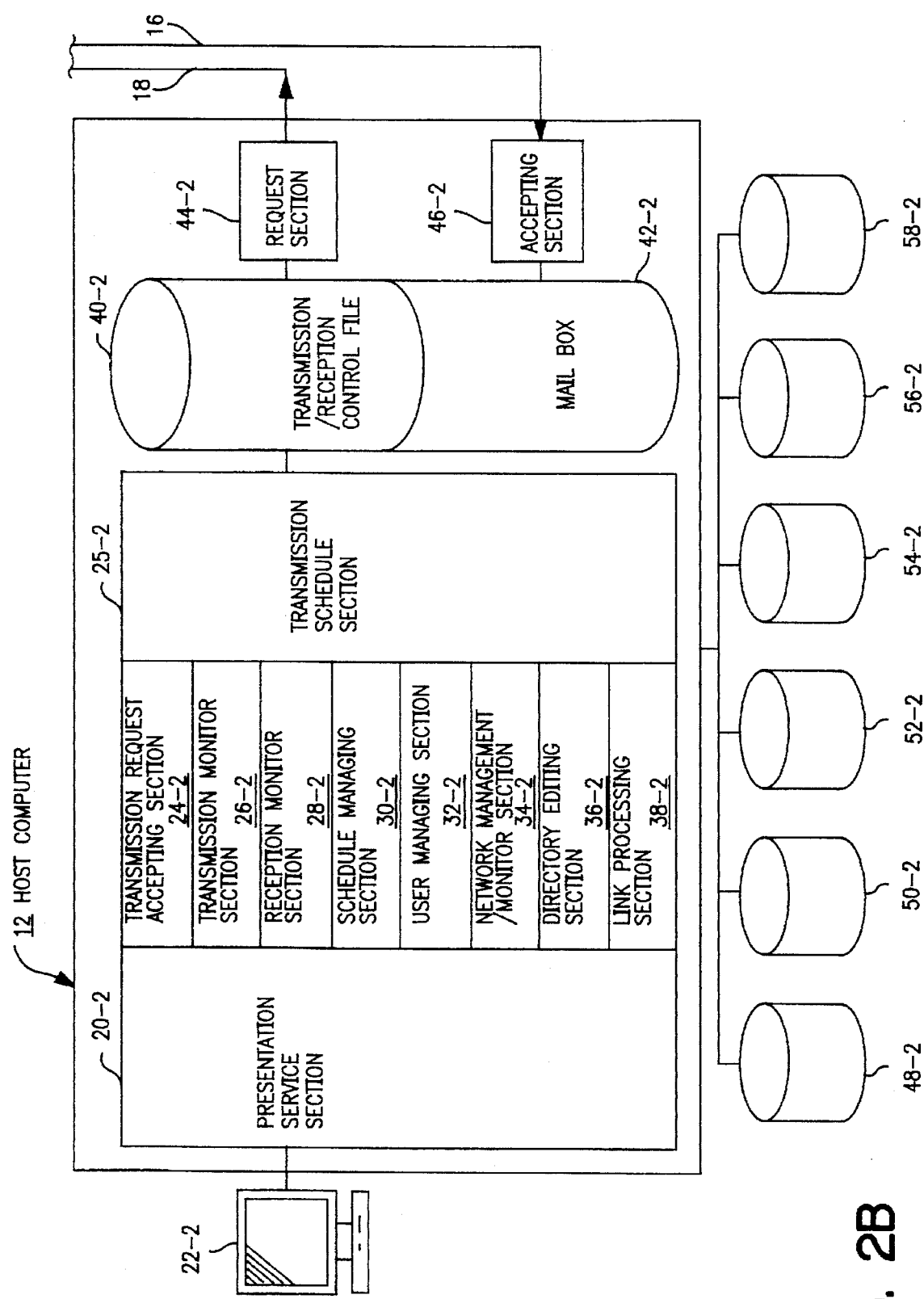

FIGS. 2A and 2B show functions of the host computer 10 and the workstations 12 in FIG. 1. First, the host computer 10 side will be explained. The host computer 10 has: a presentation service section 20-1 which is realized by the OS which is peculiar to the host computer; a transmission request accepting section 24-1; a transmission monitor section 26-1; a reception monitor section 28-1; a schedule managing section 30-1; a user managing section 32-1; a network management/monitor section 34-1; a directory editing section 36-1; a link processing section 38-1; and, further, a transmission scheduler section 25-1.

The presentation service section 20-1 includes a display apparatus, a key board, a mouse, and the like and executes an input/output control between the service section 20-1 and a user interface section 22-1. The transmission request accepting section 24-1 accepts a transmission request from the user interface section 22-1. As a transmission request that is accepted by the transmission request accepting section 24-1, there are Mode 1 and Mode 2 in the invention. Mode 1 relates to a transmission request to transmit file data from the host computer 10 to another workstation 12. Mode 2 relates to a transmission request to request a transfer of file data to the workstation 12. The transmission monitor section 26-1 monitors the requested transmission information. The reception monitor section 28-1 monitors the accepted reception information. The transmission scheduler section 25-1 realizes a data transmitting function by forming a schedule. Specifically speaking, the transmission scheduler section 25-1 forms transmission control information on the basis of the transmission request accepted by the transmission request accepting section 24-1. At the time of the reception, the transmission scheduler section 25-1 processes reception control information included in the header portion of the reception information. The schedule managing section 30-1 manages a transmission/reception control file which is formed by the transmission scheduler section 25-1. The user managing section 32-1 manages information regarding the user of the system. The network management/monitor section 34-1 confirms or monitors a connecting state of the network constructed by transmission paths. The link processing section 38-1 executes a link process with subsystems which the host computer 10 possesses in association with the data transmission/reception. For instance, a process for reading the file in which the transmission was requested from the subsystem and supplying to the transmission scheduler section 25-1, or a process for receiving the received file data from the transmission scheduler section 25-1 and sending to the subsystem, or the like is executed.

In dependence on a memory device such as a hard disk or the like, the host computer 10 is provided with: a user information management file 48-1; a network management file 50-1; a link process job management file 52-1; a log information management file 54-1; a system control management file 56-1; and a directory information management file 58-1. A series of management information regarding the file data stored in the subsystems of the host computer 10 are stored in the user information management file 48-1. Various information necessary for the network management such as host name, ID, address management, and the like which are necessary for a data transmission are stored in the network management file 50-1. An information kind name and the like for a job activation regarding the data file received from the workstation are stored in the link process job management file 52-1. Management information regarding the log-in and log-off of the host computer 10 is stored in the log information management file 54-1. Various information regarding the system control is stored in the system control management file 56-1. Management information to unify a plurality of real files stored in the subsystems of the host computer 10 is stored in the directory information management file 58-1. Subsequent to the transmission scheduler section 25-1, a transmission/reception control file 40-1 and a mail box 42-1 are provided in parallel. The transmission control information when data is transmitted from the host computer 10 to the workstation 12 and the reception control information when data is transmitted from the workstation 12 to the host computer 10 are stored in the transmission/reception control file 40-1, respectively. The mail box 42-1 constructs storing locations of the transmission data and reception data. At the time of the transmission, the transmission data is stored into the mail box and, after that, the data is transferred to the subsystem side. Subsequent to the transmission/reception control file 40-1, a request section 44-1 is provided and an accepting section 46-1 is provided on the mail box 42-1 side. The request section 44-1 has a function as a client, which will be explained hereinlater. The accepting section 46-1 has a function as a server, which will be explained hereinlater.

Although the OS is different, since a functional construction on the workstation 12 side is substantially the same as that on the host computer 10 side, the corresponding relation is shown by adding −2 after the same reference numerals. In this instance, the request section 44-1 of the host computer 10 is connected to an accepting section 46-2 of the workstation 12 by a transmission path 16. A request section 44-2 of the workstation 12 is connected to the accepting section 46-1 of the host computer 10 by a transmission path 18.

FIG. 3 shows a practical example of the system control management file 56-1 provided for the host computer 10 in FIG. 2. A mail box, a self host station name, a self host factory name, a self host code system, an information kind name, and further, a station name, a factory name, and a code system of another workstation as a communication partner of the host computer 10 are respectively stored in the system control management file 56-1 on the host computer 10 side. Those items are expressed by information shown as codes on the right side. By the information of the system control management file 56-1, the host computer 10 has two mail boxes defined as "VOL1" and "VOL2". The mail boxes are managed by the name of "DISK2". The station name of the host computer itself is set to "H1" and the factory name is set to "HOST1". The code system of the host computer 10 is set to "EBCDIC", which is different from the code system "EUC" of the workstation. The information kind name denotes the file data transmitted from the host computer to the workstation. Further, a station name "W1" of the workstation and a file name "WORKST1" are provided as a partner to which the host computer can transfer data.

FIG. 4 shows the contents of a system control management file 56-2 provided for the workstation 12 in FIG. 2. The system control management file 56-2 on the workstation side also has fundamentally the same contents as those on the host computer side shown in FIG. 3 and differs with respect to a point in which the transmission original side is set to the workstation itself and the partner is set to the host computer. The system control management file 56-2 of the workstation has "VOL1" as a mail box and is defined by "root/SOLT".

FIG. 5 shows the contents of the link process job management file 52-1 provided on the host computer 10 side in FIG. 2. Job activation information for the file data which was transmitted to the workstation 12 is stored. Namely, the information kind names of the control management file 56-1 in FIG. 3 are set into indices as management items and job management codes "JOB1" and "JOB2" are stored for them.

Figure 6:
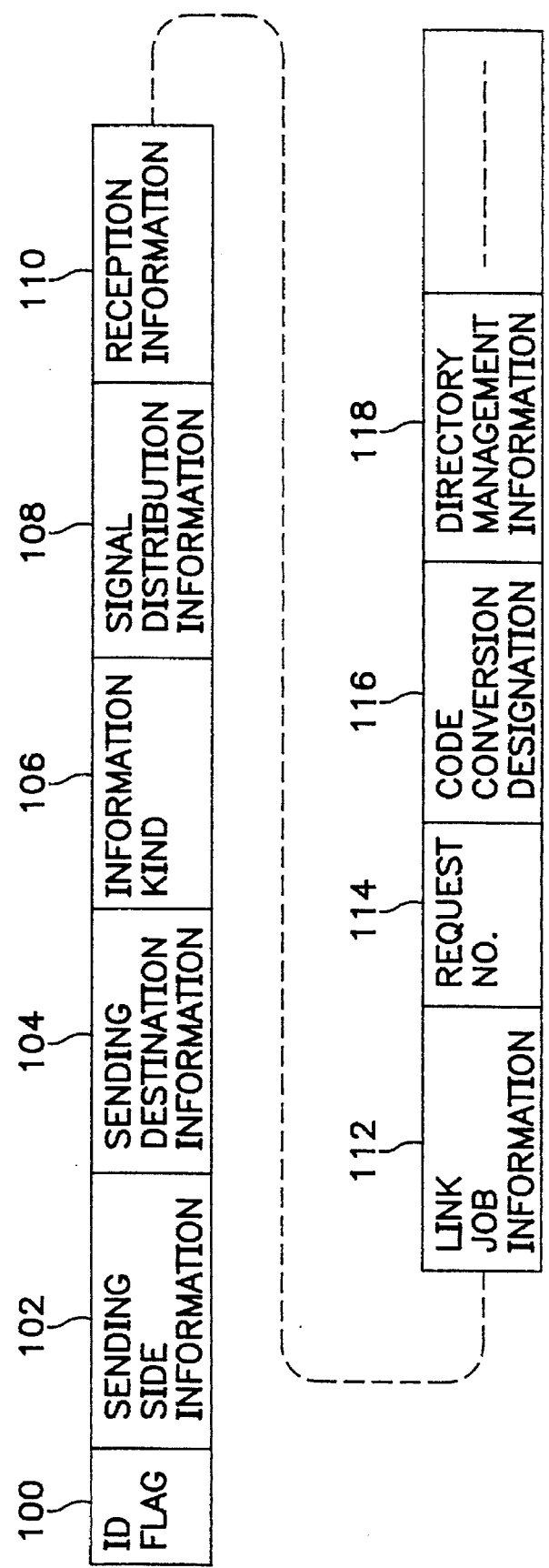
FIG. 6 is an explanatory diagram of a transmission/reception control file in FIG. 2.

FIG. 6 shows the details of the transmission/reception control file 40-1 in FIG. 2. The transmission/reception control file 40-1 comprises: an ID flag 100; sending side information (transmission original side information) 102; sending destination side information (transmission destination side information) 104; an information kind 106; signal distribution information (transmission information) 108; reception information 110; link job information 112; a request No. 114; code conversion designation 116; and directory management information 118. The details of those information are shown in FIGS. 7 to 13.

FIG. 7 shows the ID flag 100. (R) is used when transmitting and (S) is used when receiving. FIG. 8 shows the transmission original side information 102 which is constructed by a self computer name and requester information. As a self computer name, "HOST1" is used in case of a host computer and "WORKST1" is used in case of a workstation. FIG. 9 shows the sending destination information 104 which denotes another computer name as a transmission partner. For example, in case of the host computer, "WORKST1" indicative of another workstation is used. In case of the workstation, "HOST1" indicative of the host computer is used. Further, request information is added.

FIG. 10 shows the information kind 106 of a target of the data transmission. It is sufficient to insert a serial number of, for example, X=1, 2, 3, ... into a distinguishable information kind name X. FIG. 11 shows the signal distribution information (transmission information) 108 with respect to both of the host computer and the workstation. The signal distribution information 108 is constructed by items such as transmission file name, edition, allocation unit, apparatus type, number of records, record length, block length, and file format. "edition" in this instance denotes an index showing a storing unit of the mail box in the host computer and workstation. The allocation unit is the minimum data unit in the host computer and the workstation. In the embodiment, the allocation unit can be set on a block, track, or cylinder unit basis for the host computer. On the other hand, the allocation unit is set on a byte unit basis for the workstation. The apparatus type indicates the type of the magnetic disk apparatus connected to the host computer and workstation. In the embodiment, although F6425 and F6421 manufactured by Fujitu Ltd. constructing the subsystem are provided on the host computer side, no subsystem is installed on the workstation side. Therefore, the record length, block length, and file format which are peculiar to the magnetic disk apparatus are set with respect to only the host computer side and none of them is set on the workstation side.

FIG. 12 shows the details of the reception information 110 in FIG. 6. The reception information 110 corresponds to the signal distribution information (transmission information) 108 in FIG. 11 and has items such as transmission file name, edition, allocation unit, apparatus type, number of records, record length, block length, and file format. The reception information 110 has a construction obtained by exchanging the signal distribution information in FIG. 11 with regard to the workstation and the host computer, respectively.

FIG. 13 shows the details of the link job information 112 in FIG. 6. The link job information 112 is the information to activate a job on the partner side with respect to the file data transmitted to the partner side by the host computer 10 or workstation 12 and includes items such as inactivation, activation 1, activation 2, completion OK, and completion NG.

When "inactivation" is set, a job regarding the reception file on the data transfer destination side isn't executed. When "activation 1" is set, only a job of the reception file is executed and the result isn't returned. When "activation 2" is set, job result data is returned after the execution of the job. "completion OK" and "completion NG" relate to flag information indicative of the completion or incompletion of the job execution result. In the case where "activation 2" is set and the job result is returned by the link job information 112 in FIG. 13, it is necessary to set the request No. 114 shown in FIG. 6 subsequent to the link job information 112.

The code conversion designation 116 in FIG. 6 is the designation to automatically convert the respective peculiar code formats of the host computer and the workstation into the code format of the partner when the data is transmitted from the host computer to the workstation or from the workstation to the host computer.

Figure 14:
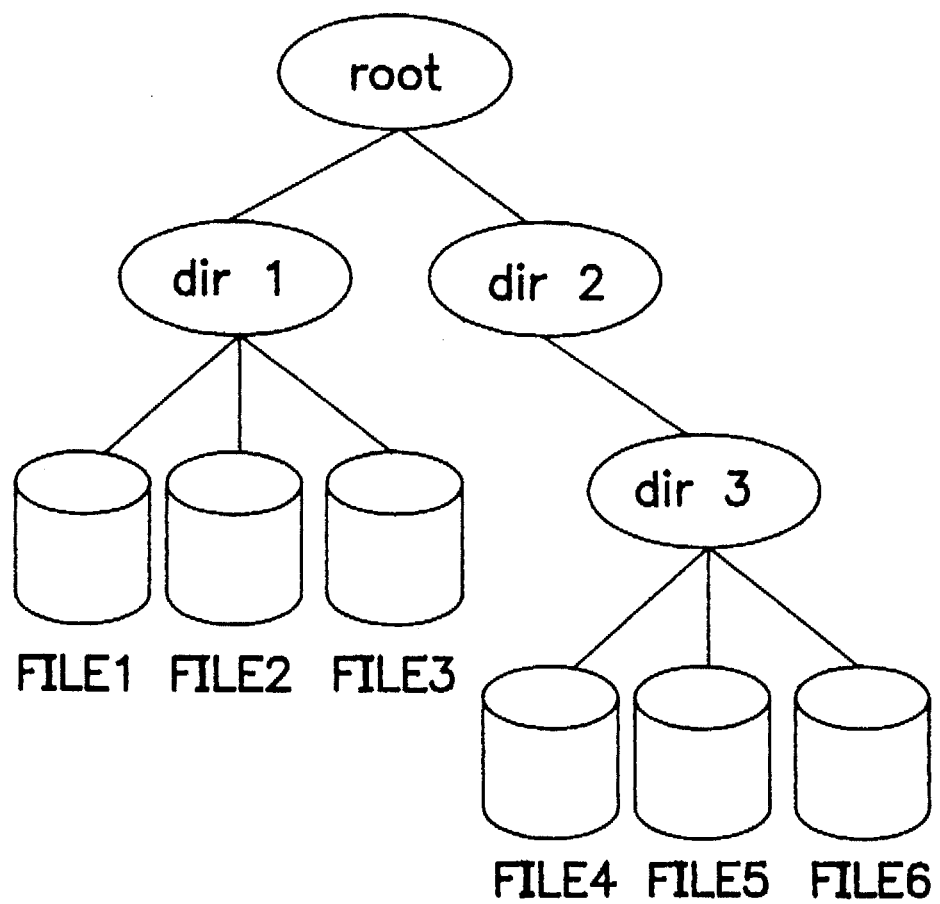
FIG. 14 is an explanatory diagram of a directory construction.
Figure 15:
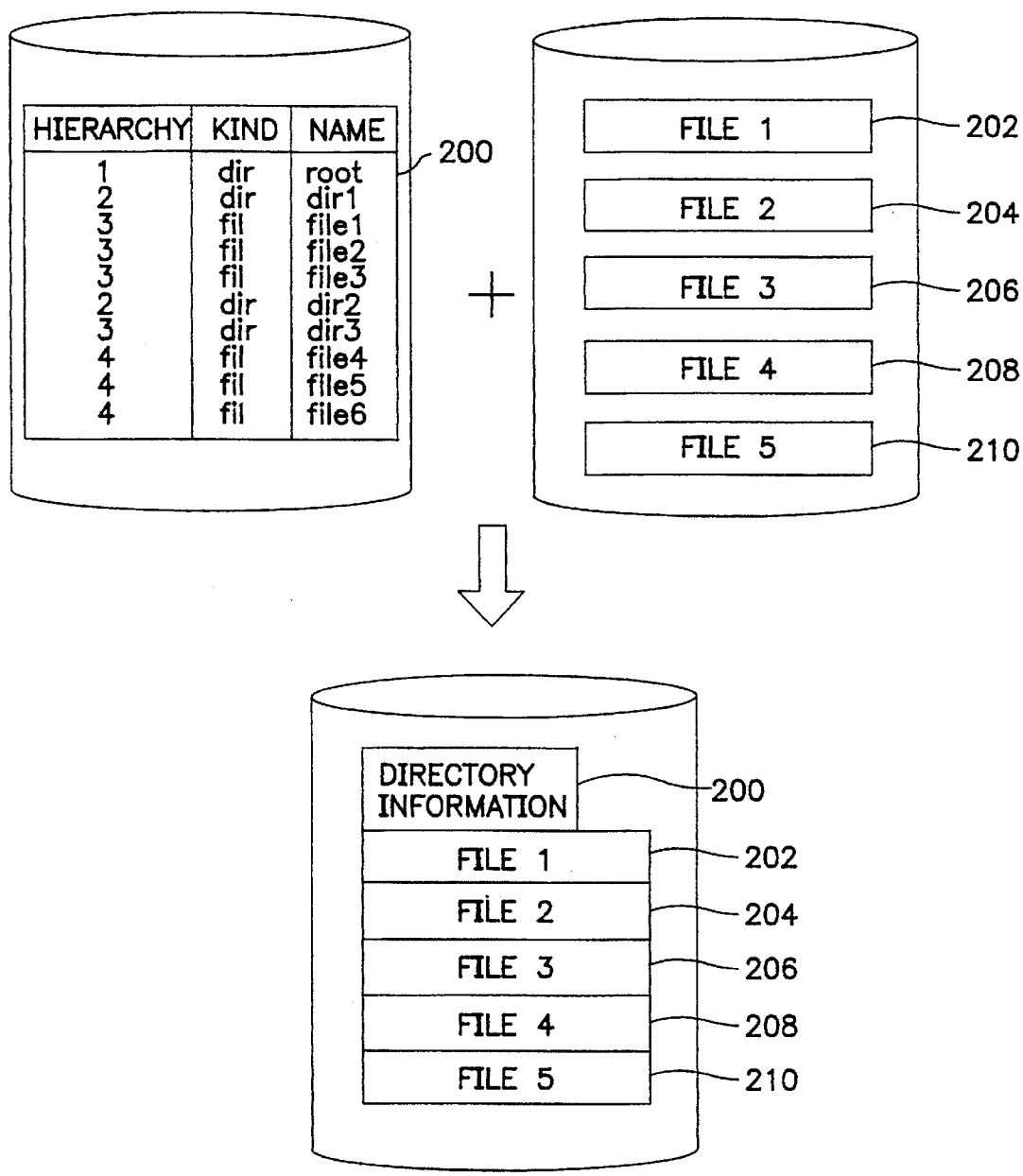
FIG. 15 is an explanatory diagram of a reconstruction of the directory construction by a transmission of directory information and real files in FIG. 14.

The directory management information 118 in FIG. 6 will now be explained. FIG. 14 shows a file construction on the workstation 12 side. The file construction has a directory structure to manage "files 1 to 6" as real files under the domination of "root", "dir1", "dir2", and "dir3" as directory management information. In the ordinary file transfer, a file transmission in which either one of the real files "file 1 to 6" in FIG. 14 is designated is executed. On the other hand, when the directory management information 118 in FIG. 6 is set, the directory information to specify the file construction in FIG. 14 is transferred. That is, the file construction in FIG. 14 is divided into directory information 200 and real file data 202 to 210 as shown in FIG. 15: By designating the directory management information 118 in FIG. 6, the directory information 200 is extracted after completion of the transmission of the real file data 202 to 210 and can be sent to the partner side. Therefore, the directory information 200 and the real file data 202 to 210 can be combined on the partner side and the file construction shown in FIG. 14 can be reconstructed.

[Client and server]

Figure 16:
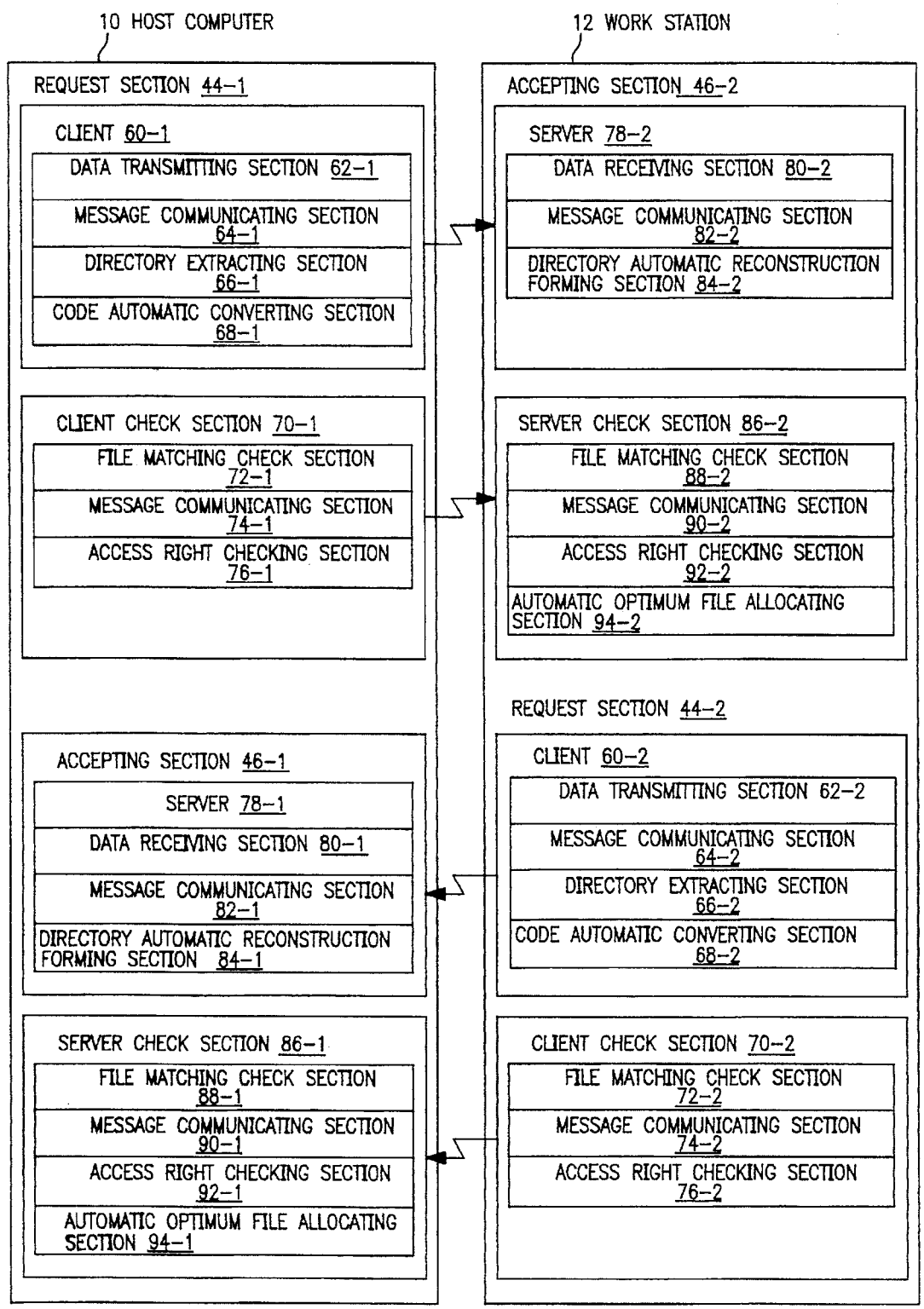
FIG. 16 is a functional block diagram of a client and servers provided in FIG. 2.

FIG. 16 shows the details of the request section and accepting section of the host computer 10 and the accepting section and request section of the workstation 12 in the system construction in FIG. 2. A client 60-1 is provided for the request section 44-1 of the host computer 10. In correspondence to it, a server 78-2 is provided for the accepting section 46-2 of the workstation 12. On the other hand, a client 60-2 is provided for the request section 44-2 of the workstation 12. In correspondence to it, a server 78-1 is provided for the accepting section 46-1 of the host computer 10. As mentioned above, the host computer 10 and the workstation 12 of the present invention construct a client/server system having a client and a server.

In such a client/server system, the client is set to the data transmission original side and the server is set to the data transmission destination side. There are not only a case where data is merely sent from the client to the server but also a case where a transfer of the data held on the server side is requested for the server from the client and, in response to such a request, the requested data is transferred from the client on the transfer request destination side to the server on the transmission request original side. In the invention, explanation is made on the assumption that the former case is set to Mode 1 and the latter case is set to Mode 2.

As for the clients 60-1 and 60-2, for example, the client 60-1 of the host computer 10 fundamentally has a data transmitting section 62-1 and a message communicating section 64-1. The data transmitting section 62-1 obtains transmission control information from the transmission/reception control file in FIG. 2 on the basis of a transmission request, stores it into the header portion, stores the file data as a transfer target into the body portion and transmits. The message communicating section 64-1 transmits and receives various information necessary for the data transmission to/from a message communicating section 82-2 of the server 78-2 of the workstation 12 serving as a partner side. In addition to such fundamental functions of the data transmitting section 62-1 and message communicating section 64-1 in the client 60-1, a directory extracting section 66-1 and a code automatic converting section 68-1 are further provided in the invention.

A data receiving section 80-2 receives the transmission data from the data transmitting section 62-1 provided for the client 60-1. The message communicating section 82-2 transmits/receives various communication information associated with the data transmission to/from the client 60-1. In addition to such a fundamental function as a server 78-2, a directory automatic reconstruction forming section 84-2 is newly provided in the invention. A client 60-2 provided for the workstation 12 and the server 78-1 provided for the host computer 10 also have functions similar to the functions of such client 60-1 and server 78-2.

Further, in the invention, client check sections 70-1 and 70-2 are provided for the request sections 44-1 and 44-2 of the host computer 10 and workstation 12, respectively. Server check sections 86-1 and 86-2 are also newly provided for the servers 78-1 and 78-2 of the host computer 10 and workstation 12. The client check section 70-1 provided for the request section 44-1 of the host computer 10, for example, has a file matching check section 72-1, a message communicating section 74-1, and an access right check section 76-1. The server check section 86-2 on the workstation 12 side corresponding to the client check section 70-1 has a file matching check section 88-2, a message communicating section 90-2, an access right check section 92-2, and an automatic optimum file allocating section 94-2.

The file matching check section 72-1 provided for the client check section 70-1 checks a data attribute, a capacity, a format, and the like of the requested transmission file before the transmission and sends them to the server check section 86-2 of the workstation 12. The file matching check section 88-2 judges whether the file to be transmitted can be received or not with respect to all items of the matching check information. In this case, when the OSs are identical, the file managements are also equal, therefore, the check items perfectly coincide. In the invention, however, since the OS of the host computer 10 differs from that of the workstation 12, a check of the data attribute, capacity, and format is executed in the form adaptive to each hardware. The judgement result regarding whether the file can be received or not is returned to the client check section 70-1. In response to the return of the judgement result indicating that the transmission file can be received from the server check section 86-2, the client check section 70-1 hands over the process to the client 60-1, thereby transmitting the file data. Various communications between the client check section 70-1 and the server check section 86-2 are executed by the message communicating sections 74-1 and 90-2. The access right check section 76-1 is further provided for the client check section 70-1. In correspondence to it, the access right check section 92-2 is provided for the server check section 86-2. The access right check sections 76-1 and 92-2 on the client and server sides are used when the file transmission is requested from the host computer 10 to the workstation 12. The access right check section 76-1 provided for the client check section 70-1 of the host computer 10 sends the user ID and password of the workstation 12 as a data transfer request destination side from the self log information management file 54-1 (refer to FIG. 2) to the server check section 86-2 of the workstation 12, thereby allowing the access right check section 92-2 to judge a validity of the received user ID and password. When the access right check section 92-2 judges that the received user ID and password are valid, the acquisition of the access right for the workstation 12 is notified to the client check section 70-1 of the host computer 10. After that, a previous checking process by the file matching check section 72-1 is executed and the process is handed over to the data transfer request by the data transmitting section 62-1 of the client 60-1.

Further, the automatic optimum file allocating section 94-2 is provided for the server check section 86-2 of the workstation 12. In the case where the reception file of the transmission data from the host computer 10 has previously been allocated in the workstation 12, the automatic optimum file allocating section 94-2 allocates the corresponding reception file in the mail box which has been prepared by the previous allocation as an optimum file.

In the case where the designated reception file is not previously allocated to the workstation 12, the necessary reception file is assured in the mail box on the basis of the received check information, namely, the data attribute, capacity, and format of the transmission file. Further, in the case where no file is previously allocated and no reception file is designated, the whole vacant capacity in the mail box is checked and when there is a necessary vacant capacity, the reception file having an arbitrary reception file name is automatically allocated as an optimum file on the basis of the check information.

In the present invention, therefore, even when the reception file is not previously allocated and further, the reception file name isn't designated, the data transmission can be normally executed without causing a transmission error. The operations of such client check section 70-1 and server check section 86-2 are also similarly executed in the client check section 70-2 and the server check section 86-1.

Further, the directory extracting section 66-1 provided for the client 60-1 of the host computer 10 automatically extracts the directory information 200 in FIG. 15 and sends it to the server 78-2 after the real file data was transmitted. In correspondence to it, the directory automatic reconstruction forming section 84-2 is provided for the server 78-2. The directory automatic reconstruction forming section 84-2 reconstructs the directory information for the data of the real file already received on the basis of the received directory information, so that the file construction in which the directory information 200 and the real files 202 to 210 are combined as shown in FIG. 15 can be reconstructed on the reception side.

Further, the host computer 10 in FIG. 2 has the directory editing section 36-1. The directory editing section 36-1 has an editing function to change or correct the directory information to be transmitted to the workstation 12 side. When the editing process of the directory information is executed by the directory editing section 36-1, therefore, the directory extracting section 66-1 of the host computer 10 transmits the edition information together. When the edition information is received in addition to the directory information, the directory automatic reconstruction forming section 84-2 on the workstation 12 side corrects or changes the reconstructed directory information in accordance with the edition information, thereby enabling new directory information to be automatically produced.

[Data transmission request and data transmission]

Figure 17:
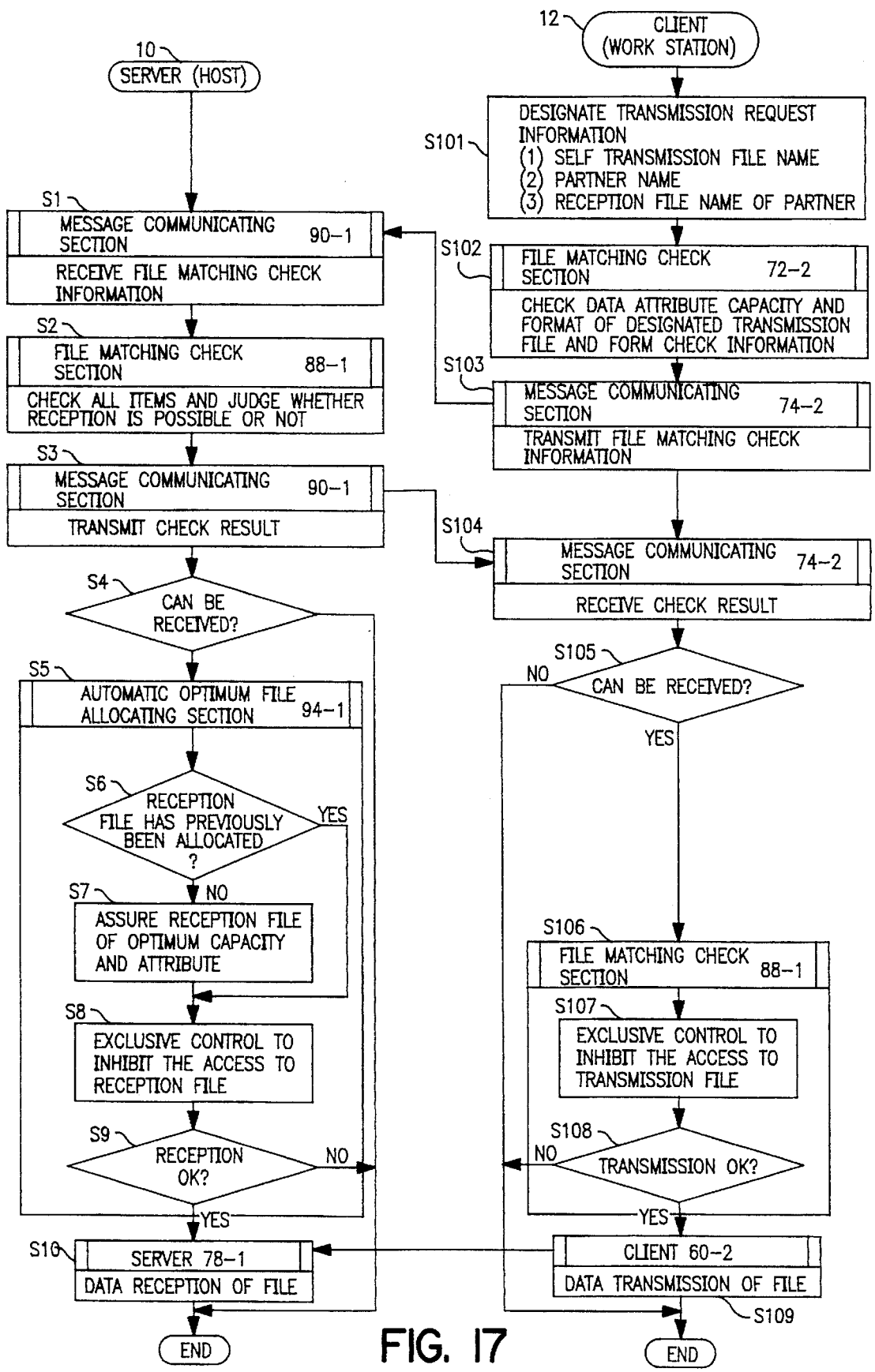
FIG. 17 is a flowchart for the transmitting operation of file data from the workstation to the host computer.

A flowchart of FIG. 17 shows the processing operation when the host computer 10 is designated and the file data is transmitted from the workstation 12 in FIG. 16. Each block of the flowchart shows both of the portion to execute a process and the contents of the process.

The workstation 12 as a transmission original side designates information to request the transmission in step S101. In the designation of the transmission request information, the following items are designated.
I. self transmission file name
II. partner host name
III. reception file name of partner host Subsequently in step S102, a file matching check section 72-2 provided for the client check section 70-2 of the workstation 12 checks the data attribute, capacity, and format of the designated transmission file and forms check information. The check information formed by the file matching check section is transmitted by a message communicating section 74-2 to the host computer 10 in step S103. The server check section 86-1 of the host computer 10 receives the file matching check information by a message communicating section 90-1 in step S1 and hands over the information to a file matching check section 88-1 in step S2. Since the OS of the file matching check section 88-1 is different from the OS of the workstation 12 on the transmission original side, the file matching check section 88-1 checks the adaptability to the self hardware construction with respect to the data attribute, capacity, and format of the requested transmission file, thereby judging whether the file can be received or not. When the file can be received, the check result indicating that the file can be received is transmitted by the message communicating section 90-1 to the workstation 12 in step S3. The previous check result is received by the message communicating section 74-2 provided for the client check section 70-2 of the workstation 12 in step S104. When it is judged that the file can be received in step S105, the file matching check section 72-2 in step S106 executes an exclusive control to inhibit the access to the transmission file in step S107. When the file data can be transmitted in step S108, the process is handed over to the client 60-2 of the workstation 12 and the data of the file is transmitted in step S109.

On the other hand, in the host computer 10 as a transmission destination side, in the case where the transmission file can be received in step S4 after transmitting the check result of the previous check in step S3, the processing routine advances to the process of an automatic optimum file allocating section 94-1 shown in step S5. In the automatic optimum file allocating section 94-1, first in step S6, a check is made to see if the reception file has previously been allocated. When the file has previously been allocated, the file is designated as a reception file. After the exclusive control to inhibit the access to the reception file was executed in step S8, when "reception OK" is obtained in step S9, the process is handed over to the reception of the file data by the server 78-1 of step S10.

When the reception file is not previously allocated, however, step S7 follows and the reception file of the optimum capacity and attribute is assured in the mail box on the basis of the file matching check information already received, namely, on the basis of the data attribute, capacity, and format of the transmission file. After that, the processing routine advances to the exclusive control to inhibit the access to the reception file in step S8.

In the invention, therefore, even when the reception file is not previously allocated to the host computer 10 serving as a transmission destination side, no communication error occurs and the file data can be normally transmitted from the workstation 12.

Figure 18:
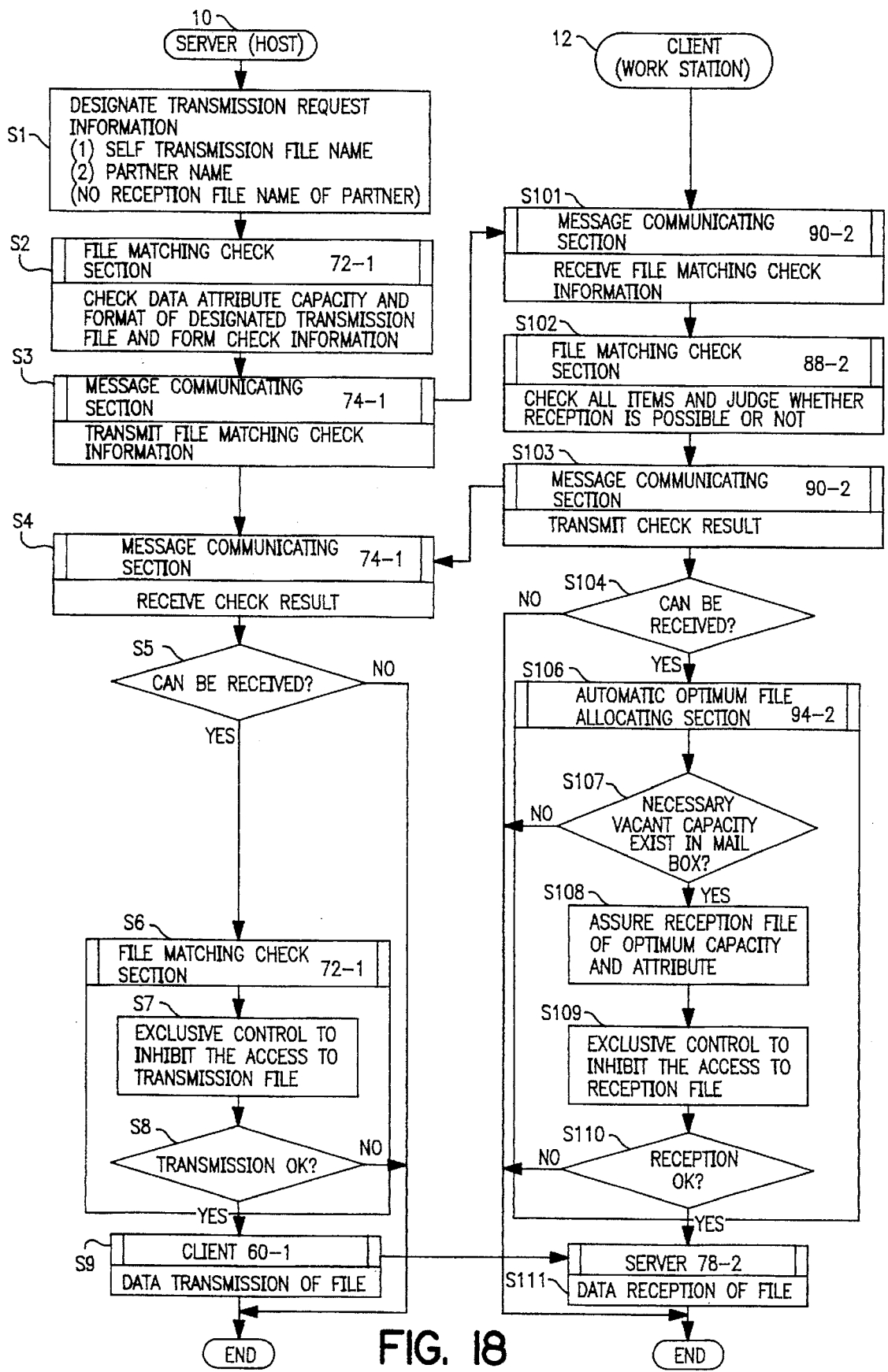
FIG. 18 is a flowchart for the processing operation in the case where no reception file is previously been allocated and no reception file name is designated.

FIG. 18 relates to the case where data is transmitted from the host computer 10 to the workstation 12 in a manner opposite to FIG. 17. In this instance, it is now assumed that the reception file is not previously allocated from the host computer 10 to the workstation 12 and, further, the reception file name is not also designated for the partner side in the host computer 10 on the transmission original side. First, although the processes by the client check section 70-1 shown in steps S1 to S7 on the host computer 10 side serving as a transmission original side are fundamentally the same as the processes by the client check section 70-2 on the workstation side in FIG. 17, the reception file name for the partner side isn't designated in step S1 in FIG. 18.

For such a transmission of the file matching check information having no designation of the reception file from the file matching check section 72-1 provided for the client check section 70-1 of the host computer 10, in the server check section 86-2 of the workstation 12, a process of the previous check information by the file matching check section 88-2 and message communicating section 90-2 in steps S101 to S104 is executed. Although the above process is similar to the process in FIG. 17, the process of the automatic optimum file allocating section 94-2 in step S106 is different. That is, in the process of the automatic optimum file allocating section 94-2 in step S106, since the reception file is not previously allocated and no reception file name is designated, all of the vacant capacities of the mail box are checked in step S107 and a check is also made to see if the vacant capacity necessary for the reception of the requested transmission file exists in the mail box or not. When there is a necessary vacant capacity in the mail box, Step S108 follows. The reception file of the optimum capacity and attribute according to the data attribute, capacity, and format of the transmission file obtained by the previous check information is assured on the mail box and, further, an arbitrary file name is allocated. In a manner similar to the above, the exclusive control to inhibit the access to the reception file is executed in step S109 and when it is judged that the file can be received in step S110, the process is handed over to the data reception of the file by the server 78-2 in step S111.

[Data transfer request by using user ID and password]

Figure 19:
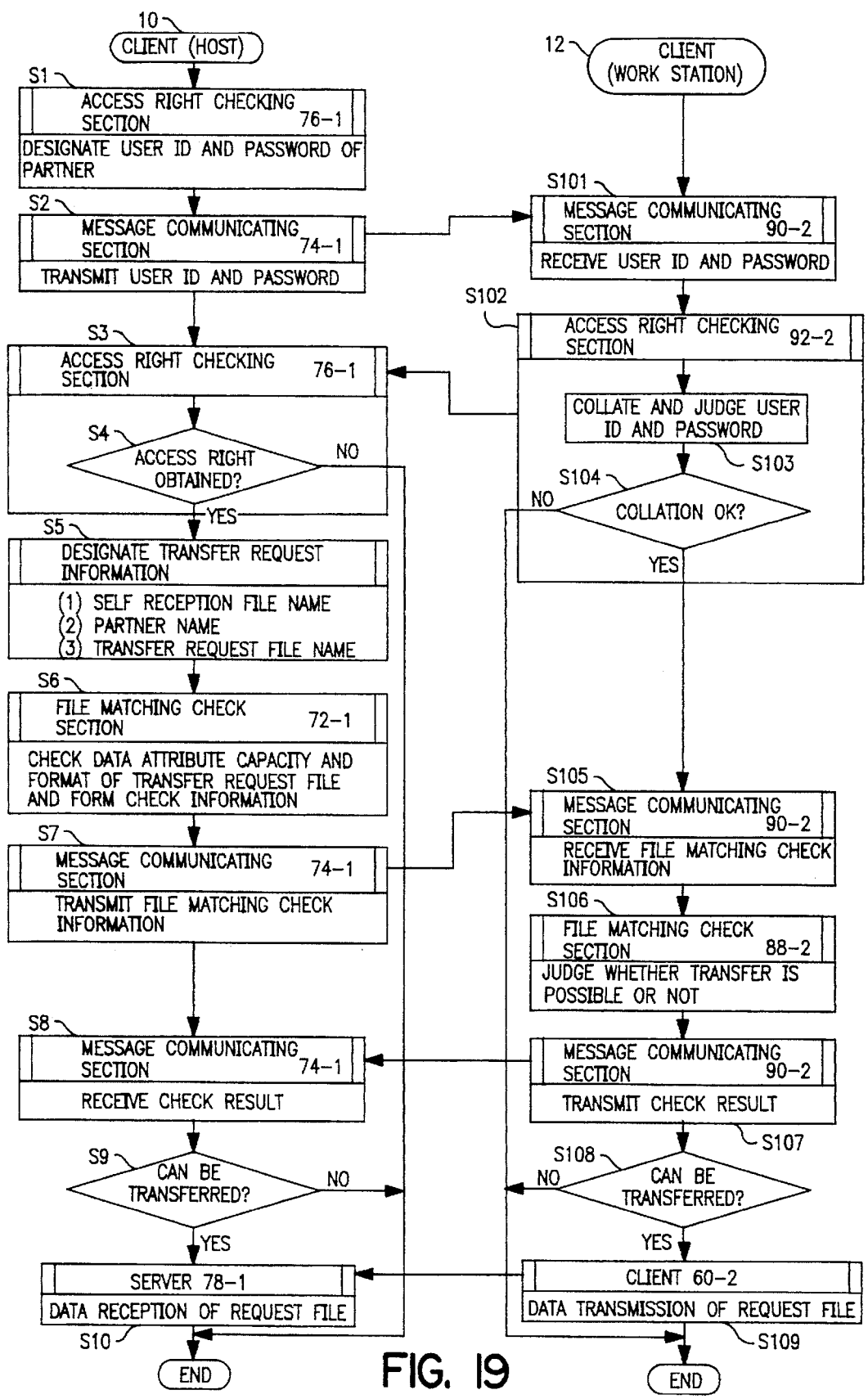
FIG. 19 is a flowchart for the processing operation in the case where a data transfer is requested from the host computer to the workstation by using a user ID and a password.

FIG. 19 shows the processes when a data transfer is requested from the host computer 10 to the workstation 12 in which a log-in is managed by a user ID and a password. First, in the client check section 70-1 of the host computer 10 serving as a data transfer request original side, the access right check section 76-1 designates a user ID and a password of the workstation 12 serving as a transfer request destination side in step S1 and they are transmitted by the message communicating section 74-1 in step S2. When the message communicating section 90-2 receives the user ID and the password in step S101, the server check section 86-2 of the workstation 12 hands over the received user ID and password to the access right check section 92-2 shown in step S102. The user ID and password are collated with self user ID and password of the workstation 12 in step S103. When they coincide as a result of the collation in step S104, an acquisition of the access right is notified to the host computer 10 by the message communicating section 90-2. The host computer 10 discriminates the presence or absence of the acquisition of the access right notified from the workstation 12 by the access right check section 76-1 in step S3. When the acquisition of the access right is recognized in step S4, step S5 follows and transfer request information is designated. Subsequently in step S6, the file matching check section 72-1 checks a data attribute, a capacity, and a format of the transfer request file and forms check information. In step S7, the message communicating section 74-1 transmits the file matching check information. The file matching check information is received by the message communicating section 90-2 of the workstation 12 as shown in step S105. The file matching check section 88-2 judges whether the file can be transferred or not in step S106. The message communicating section 90-2 transmits the result of the judgment to the host computer side in step S107. In the host computer 10, the message communicating section 74-1 receives the check result of the file transfer in step S8. When it is judged that the file can be transferred in step S9, the data receiving process of the requested file is handed over to the server 78-1 of the host computer 10 in step S10.

On the other hand, in the workstation 12 which received the transmission request, the check result of the previous check information is transmitted in step S107. After that, a check is made in step S108 to see if the file can be transferred. When it is judged that the file can be transferred, the process is handed over to the client 60-2 of the workstation 12 and the file data which was requested to transfer is transmitted in step S109.

FIG. 19 shows the case, as an example, where the user ID and the password of the workstation 12 are designated from the host computer 10 and the file data is transferred. When a user ID and a password of the host computer 10 are designated from the workstation 12 and a transfer of the file data is requested as well, similar processes are executed except that the functions of the client and the server are merely exchanged. Although the information necessary for the transfer is designated separately in steps S1 and S5 in FIG. 19, the information designation in step S5 can be also executed simultaneously in step S1.

[Return instruction of job activation result]

Figure 20:
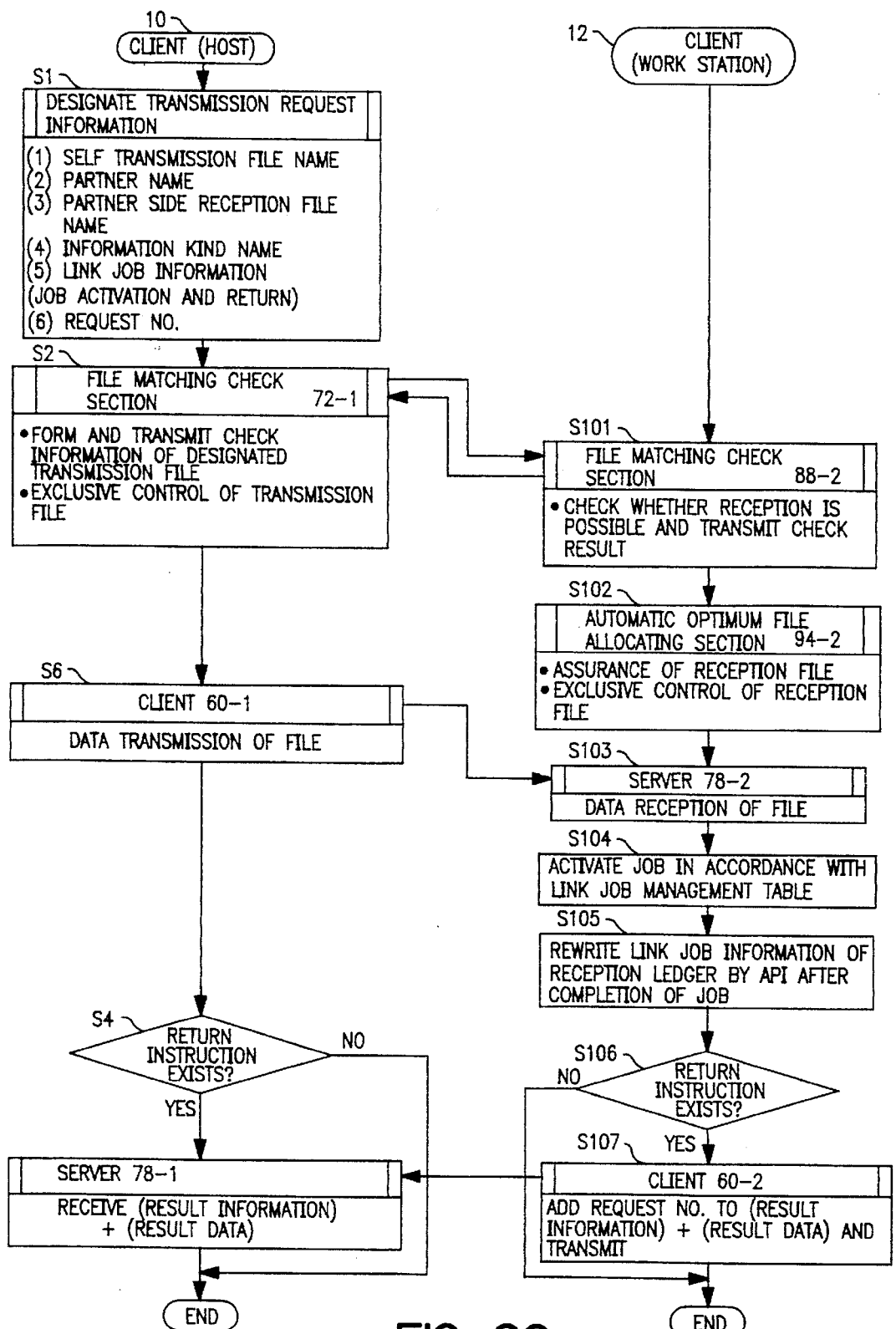
FIG. 20 is a flowchart for the processing operation in the case where a job activation and a return of the result are requested simultaneously with the data transfer.

A flowchart of FIG. 20 shows processes in which file data is transmitted from the host computer 10 to the workstation 12 and simultaneously an activation of a job on the workstation 12 side is designated and, further, result data is automatically returned after completion of the job. First, the host computer 10 serving as a data transmission original side designates transmission request information in step S1, namely, in addition to a self transmission file name, a partner name, and a partner reception file name, the host computer 10 designates an information kind name as a job target, link job information for a job activation and a return control, and further a unique request No. that is used when the job result is returned, respectively. The subsequent previous checking process by the file matching check section 72-1 and message communicating section 74-1 of the client check section 70-1 in step S2 and the transmission of the file data by the client 60-1 in step S3 are substantially the same as those in FIG. 18. The processes shown in steps S101 to S103 of the workstation 12, namely, the processes by the file matching check section 88-2 and automatic optimum file allocating section 94-2 in the server check section 86 and the receiving process of the file data by the server 78-2 are substantially the same as shown in FIG. 18.

When the workstation 12 receives the file data by the server 78-2, the link job information in FIG. 13 is obtained in a link process job management file 52-2 (refer to FIG. 2)

on the basis of the reception control information. The workstation 12, therefore, activates the job regarding the file data received in accordance with the link job management file 52-1. When the activation of the job is completed, the rewriting operation to set a flag indicative of "completion OK" which is included in the link job information of a transmission/reception control file 40-2 into 1 is executed in step S105. In this case, when the link job information shows the return instruction which has been set into "activation 2", the processing routine advances from step S106 to S107 and the process is handed over to the client 60-2 of the workstation 12 so as to add a unique request No. to the job result information and the result data and to transmit them to the host computer 10. Therefore, the job completion information and the result data are sent to the server 78-1 of the host computer 10 by the client 60-2 of the workstation 12. The host computer 10 can utilize the workstation 12 as a self tool.

Although FIG. 20 shows the case, as an example, where the data transfer which is accompanied with the return of the job result is executed from the host computer 10 to the workstation 12, even when the data transfer which is accompanied with the return of the job result is contrarily executed from the workstation 12 to the host computer 10, a similar process is executed except that the functions of the client and the server are merely exchanged.

[Transfer of directory information]

Figure 21:
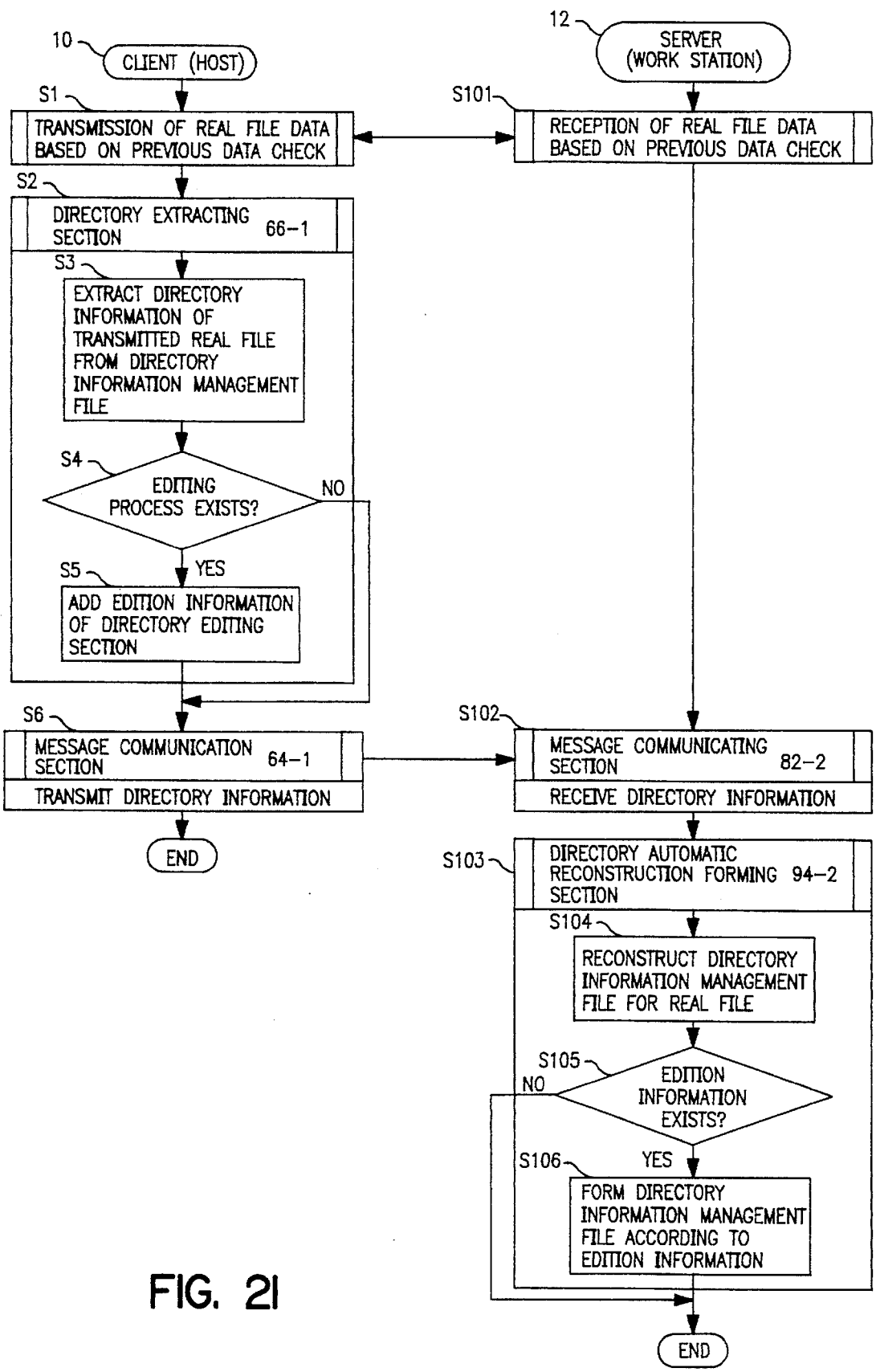
FIG. 21 is a flowchart for the processing operation to transfer the directory information together with file data.

FIG. 21 shows the processing operation when a plurality of file data are transmitted from the host computer 10 to the workstation 12 and, after that, directory information is sent as additional information and the automatic reconstruction is executed. First in step S1, the client check section 70-1 and client 60-1 of the host computer 10 transmit the file data on the basis of the previous check as shown in steps S1 to S9 in FIG. 18. The server check section 86-2 and server 78-2 of the workstation 12 receive the file data on the basis of the previous check as shown in steps S101 to S109 in FIG. 18. When the transmission of the file data from the host computer 10 is finished in step S1, step S2 follows and the directory extracting section 66-1 provided for the client 60-1 automatically extracts the directory information. Namely, in step S3, the directory information of the real file which has already been transmitted is extracted from the directory information management file. Subsequently in step S4, a check is made to see if the editing process has been executed or not. When the editing process has been executed, the edition information of the directory editing section 36-1 (refer to FIG. 2) is extracted and is added to the directory information. In step S6, the directory information or the information which is obtained by adding the edition information to the directory information is transmitted to the workstation 12 by the message communicating section 64-1.

In the server 78-2 of the workstation 12, the message communicating section 82-2 receives the directory information or the information obtained by adding the edition information to the directory information in step S102 and the process of the directory automatic reconstruction forming section 84-2 is executed in step S103. A directory information management file for the real file is first reconstructed in step S104. For example, as shown in FIG. 15, a directory information management file in which the directory management information 200 is combined with the received real files 202 to 210 is reconstructed. Due to this, the workstation 12 which received the data transfer can manage the file construction by the directory information as shown in, for example, FIG. 14 in a manner similar to the host computer 10. Subsequently, in step S105, the presence or absence of the edition information is checked. When the edition information exists, a directory information management file according to the edition information is formed in step S106.

Such a transmission of the directory information and, further, the edition information after completion of the file data transfer in FIG. 21 enable the reconstruction of the directory information and, further, the change or correction by using the edition information to be executed on the transmission destination side. A flexible and efficient file transfer can be consequently realized.

As mentioned above, according to the invention, the operational errors which are caused between the computers having different OSs by the operator can be eliminated almost perfectly. Without needing any special technical knowledge which is required for the computers which operate such as host computer and workstation of different OSs, the user can execute a data transfer easily and certainly to the computers having different kinds of OS within a range of the knowledge regarding the host computer or workstation with which the user is concerned. As a result, in association with an increase in number file transfer times between the computers of different OSs, the data transfer according to the invention which is smooth, efficient, and further, safe including a security can be executed.

Although the above embodiments have been mentioned with respect to the case of the data transmission between the host computer and the workstation of different OSs as an example, the invention isn't limited to the above embodiments. The invention can be also applied to the data transfer by the server/client between the computers of different OSs coupled by a network. The invention isn't also limited by the numerical values of the embodiments.

What is claimed is:

1. A data transmission processing method for transmitting and receiving file data via a transmission path between, a transmitting computer and a receiving computer having a different code systems, file allocation units, file storage destination sides than the receiving computer, the method comprising:

a transmission information designating step of transmitting, from the transmitting computer, transmission designation information designating a name of a self transmission file, a transmission partner name, and a reception file name to the receiving another computer;

a previous checking step of transmitting from the transmitting computer, check information indicative of a data attribute, a capacity, a format of the self transmission file and said transmission designation information to the receiving computer;

a judging step of judging, by the receiving computer, whether the data can be received and returning a result of the judgement to the transmitting computer;

an optimum file allocating step of newly allocating a reception file for the designated file name according to the data attribute, capacity, and format as indicated in said previous checking step when a previous allocation of the file name designated by said transmission designation information has not been performed by the receiving computer; and a data transmitting step of transmitting the data of a target file from the transmitting computer to the receiving computer where the result of the judgement in said judging step indicates that the data can be received.

2. A method according to claim 1, wherein in said optimum file allocating step, when the designated reception file is not previously allocated to the receiving computer and the reception file name is also not designated in said transmission information designating step, the reception file corresponding to the data attribute, capacity, and format received in said previous checking step is allocated in a mail box by an arbitrary file name.

3. A method according to claim 1, further comprising:

an exclusive control step of allowing the receiving computer to execute an exclusive control for inhibiting access to the reception file and allowing the transmitting computer to perform an exclusive control for inhibiting an access to said transmission file where it is judged in said judging step that the reception can be performed.

4. A method according to claim 1, wherein in said transmission information designating step, additional information to designate an execution of a job of the file transmitted to the receiving computer is added to the transmission control information and transmitted, and after data of the file is received, the execution of the job is activated by the receiving computer.

5. A method according to claim 4, wherein in said transmission information designating step, job completion information and return control information of the job result data are included in the additional information to designate the job execution, and upon completion of the job, the job completion information and the job result data are automatically transmitted.

6. A method according to claim 5, wherein in the case where no return control information is included in the additional information to designate said job execution, only the job completion information is automatically transmitted.

7. A method according to claim 1, further comprising:

a directory extracting step of extracting directory information regarding the transmission file and transmitting by the transmitting computer after completion of the data transmission by the data transmitting step; and a directory reconstruction forming step of reconstructing a directory information management file of the file received by the receiving computer on the basis of the directory information transmitted in the directory extracting step.

8. A method according to claim 7, wherein in the directory extracting step, edition information to instruct a change, correction, or the like of the directory information performed prior to the transmission of the directory information is also transmitted, and in the directory reconstruction forming step, a new directory information management file is formed on the basis of the received directory information and edition information.

9. A data transmission processing method of transmitting and receiving file data between a transmitting computer and a receiving computer, the transmitting computer having a different operating system, code systems, file allocation units, file storage destination sides than the receiving computer, the method comprising:

an access right checking step of transmitting a user ID and a password from the receiving computer to the transmitting computer and causing said transmitting computer to judge a validity of the user ID and the password and to return the presence or absence of the acquisition of the access right of the receiving computer when a transfer request is sent from the receiving computer to the transmitting computer;

a transfer information designating step of transmitting from the receiving computer transfer designation information designating a self reception file name, a partner name, and a transfer request file name to the transmitting computer when the access right of the transmitting computer is obtained in said access right checking step;

a previous checking step of forming check information indicative of a data attribute, a capacity, and a format of said reception file and transmitting said check information from the receiving computer to the transmitting computer;

judging, in the transmitting computer, whether a request file can be transferred, and returning a result of the judgement to the receiving computer;

an optimum file allocating step of newly assuring a reception file of the designated file name according to the data attribute, capacity, and format received in the previous checking step when a previous allocation of the file name designated by said transmission designation information has not been performed by the receiving computer; and a data transmitting step of transmitting the data of said transfer request file from the transmitting computer to the receiving computer when the result of the judgement in said judging step indicates that the data transfer can be performed.

10. A method according to claim 9, further comprising:

a directory extracting step of extracting directory information regarding the transmission file and transmitting said directory information by the transmitting computer after completion of the data transfer by said data transmitting step; and a directory reconstruction forming step of reconstructing a directory information management file of the received file by said receiving computer on the basis of the directory information transmitted in the directory extracting step.

11. A method according to claim 10, wherein in the directory extracting step, edition information instructing a change of the directory information to be performed prior to the transmission of the directory information is transmitted, and in the directory reconstruction forming step, a new directory information management file is formed on the basis of the directory information and edition information received.

12. A data transmission processing apparatus for transmitting and receiving, via a transmission path, file data between a transmitting computer and a receiving computer, the transmitting computer having a different operating system, code system, file allocation unit, and file storage destination sides than the receiving computer, wherein the transmitting computer and receiving computer each comprise:

a client check section that, when file data is to be transmitted to another computer, forms transmission designation information including a self transmission file name, a transmission partner name and a reception file name of the transmission partner side, check information indicative of a data attribute, a capacity, and a format of said transmission file, each of the transmission designation information and the check information are transmitted to the receiving computer allowing the receiving computer to judge whether the data can be received prior to actual transmission;

a server check section for judging whether the transmission file can be received based on the transmission designation information when said transmission designation information and said check information are received from another computer, and when the previous allocation of the file name designated by said transmission designation information is not performed, for newly allocating reception file of the designated file name in accordance with the data attribute, capacity, and format of the check information to enable the data to be received, and for transmitting the result to the transmitting computer;

a client section for transmitting said file data when a response indicating that the reception can be performed is received from the receiving computer after said client check section has transmitted the check information and the transmission control information; and a server section for receiving the file data from the transmitting computer to which said server check section sent a response indicating that the reception can be performed.

13. An apparatus according to claim 12, wherein said client check section comprises:

a file matching check section for forming the check information indicative of the data attribute, capacity, and format of the transmission file in addition to the transmission designation information including the self transmission file name, transmission partner name, and reception file name of said transmission partner side when the file data is transmitted to another computer; and a message communicating section for transmitting the transmission designation formation and the check information formed by said file matching check section to the transmitting computer.

14. An apparatus according to claim 13, wherein when a response indicating that the reception can be performed is received from the transmitting computer, said file matching check section of said client check section executes an exclusive control to inhibit an access to said transmission file and hands over the process to said client section.

15. An apparatus according to claim 13, wherein when a response indicating that the reception can be performed is received from the receiving computer, said file matching check section of said client check section executes an exclusive control to inhibit an access to said transmission file and hands over the process to said client section.

16. An apparatus according to claim 13, wherein said client check section further has an access right check section for transmitting a user ID and a password to the transmitting computer when the transfer request is sent to another computer to thereby transmit the file data, and for handing over the process to said file matching check section in the case where a notification of the acquisition of the access right is received from the transmitting computer.

17. An apparatus according to claim 12, wherein said server check section has:

a file matching check section for judging whether the transmission file based on said check information can be received or not when the check information is received from another computer; and a message communicating section for responding the result of the judgement by said file matching check section to the transmitting computer.

18. An apparatus according to claim 17, wherein when a response indicating that the reception can be performed is sent to the transmitting computer, said file matching check section of said server check section executes an exclusive control to inhibit an access to said reception file and hands over the process to said server section.

19. An apparatus according to claim 17, wherein said server check section further has an access right check section for judging a validity of said user ID and password when said user ID and password are received from another computer, for responding the presence or absence of the acquisition of the access right, and handing over the process to said file matching check section.

20. An apparatus according to claim 12, wherein where the reception file designated by said transmission designation information is not previously allocated and the reception file name is also not designated by the transmission designation information, said optimum file allocating section of said server check section assures a reception file according to the data attribute, capacity, and format of said check information onto a mail box by an arbitrary file name.

21. An apparatus according to claim 12, wherein said client section adds additional information to designate a job execution of the file transmitted to the receiving computer to said transmission designation information and transmits the resultant transmission designation information.

22. An apparatus according to claim 21, wherein said client section includes job completion information and return control information of the job result data into said additional information to designate said job execution and transmits the resultant information.

23. An apparatus according to claim 12, wherein in the case where the additional information to designate the job execution of the reception file has been added to said transmission designation information, said server section activates the job after the file data was received.

24. An apparatus according to claim 23, wherein in the case where the job completion information and the return control information of the job result data are included in the additional information to designate said job execution, said server section automatically transmits the job completion information and the job result data upon completion of the job.

25. An apparatus according to claim 24, wherein in the case where no return control information is included in the additional information to designate said job execution, said server section automatically transmits only the job completion information.

26. An apparatus according to claim 12, wherein said client section has a directory extracting section for extracting directory information regarding the self transmission file and transmitting said directory information after completion of the data transmission.

27. An apparatus according to claim 26, wherein said server section has the directory reconstruction forming section which is constructed in a manner such that when directory information is received subsequently to the file data, a directory information management file of said reception file data is reconstructed on the basis of said directory information.

28. An apparatus according to claim 26, wherein said directory extracting section transmits additionally edition information to instruct a change, correction, or the like of the directory information performed prior to the transmission of the directory information.

29. An apparatus according to claim 27, wherein said directory reconstruction forming section forms a new directory information management file on the basis of the directory information and the edition information received.

30. An apparatus according to claim 12, wherein said client section has an automatic code converting section for converting the file data to be transmitted into the code that is used by the receiving computer and for transmitting said code.

31. An apparatus according to claim 12, wherein the transmitting computer is a host computer and the receiving computer is a workstation.

* * * * *